July 5, 1949.     E. J. DOMAGALL     2,474,934
RECEPTACLE FOR HOLDING INFLAMMABLE LIQUIDS
Filed Jan. 30, 1947
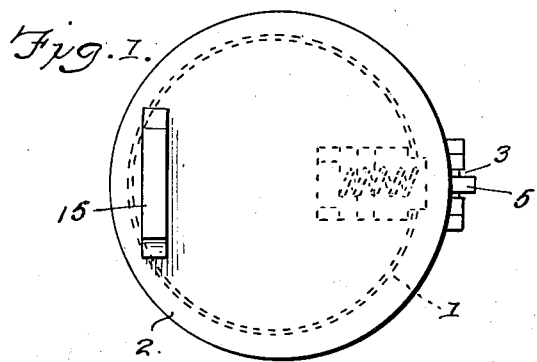
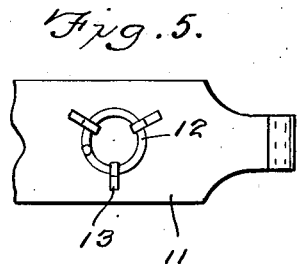
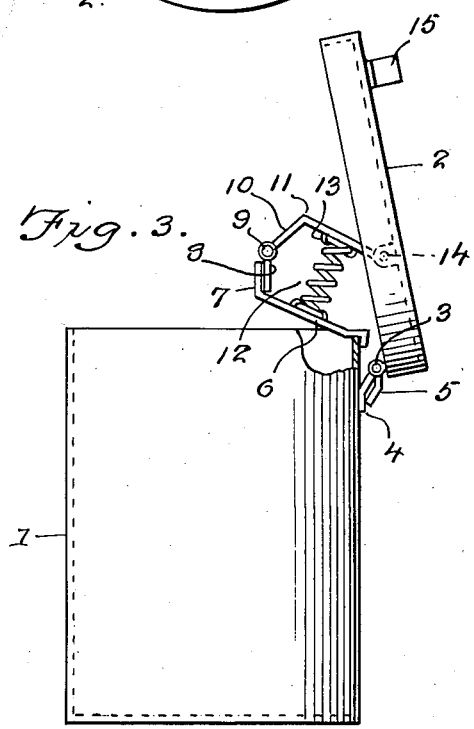
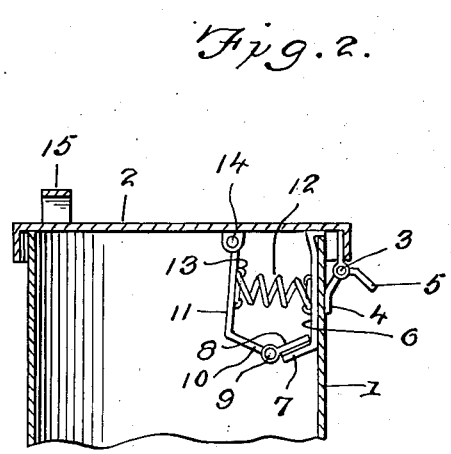
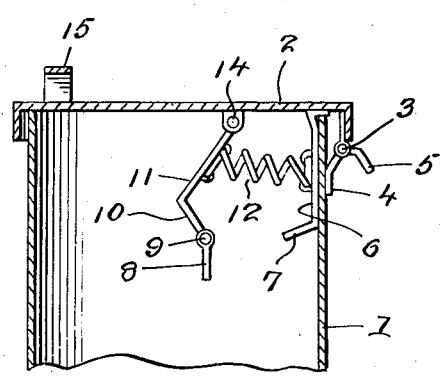
INVENTOR.
Edward J. Domagall
BY Victor J. Evans & Co.
ATTORNEYS Patented July 5, 1949

2,474,934

UNITED STATES PATENT OFFICE 2,474,934

RECEPTACLE FOR HOLDING INFLAMMABLE LIQUIDS

Edward J. Domagall, Peru, Ill.

Application January 30, 1947, Serial No. 725,401

1 Claim. (Cl. 220—89)

This invention relates to improvements in receptacles for holding inflammable liquids, and more particularly to the provision of a novel cover for such receptacles.

Receptacles for holding gasoline and similar inflammable liquids for cleaning articles generally are open and have no cover. Such a receptacle holding an inflammable liquid is dangerous as the liquid is liable to be ignited and cause a serious fire.

It is therefore an object of this invention to provide a receptacle having a safety cover or lid which automatically closes the receptacle as soon as the inflammable liquid is ignited.

A further object is to provide a safety lid for receptacles, which is positive in operation, and immediately covers a receptacle as soon as a predetermined temperature is reached.

These and other objects are attained by the novel construction and arrangement of parts hereinafter described and illustrated by the accompanying drawings, forming a part hereof, and in which:

Fig. 1 is a plan view of a cover embodying the invention.

Fig. 2 is a sectional view showing a lid covering a receptacle.

Fig. 3 is a view showing the lid raised.

Fig. 4 is a section showing parts of the device after having been separated by heat.

Fig. 5 is a view showing the manner of holding a spring used in the device.

Referring to the drawings, the device is shown to comprise a receptacle 1 covered by a lid 2 which is hinged to a plate 4 at 3, the lid carrying a member 5 which engages the plate 4 when the lid is raised to limit the backward movement thereof.

Attached to the inside of the receptacle is a plate 6 having a portion 7 turned at an angle, which is adapted to engage an arm 8 pivoted at 9 to a plate 10 having an angularly upwardly directed portion 11 to which is attached a coiled spring 12 by means of straps 13.

The plate 11 is pivoted at 14 to the lid 2, and the plate 6 pivots on the edge of the receptacle.

The arm 8 is attached to the plate 7 by means of a solder which melts around 300° to form a fusible link. The receptacle and lid are made of metal stampings, as are the plates and other parts.

The safety device can be applied to a number of articles such as gasoline wash cans, hatch covers, skylights, etc.

In operation, if at any time the inflammable liquid should catch fire, the low temperature solder between the arm 8 and plate 7 will melt, breaking the connection, and the coil spring forces the parts 7 and 8 apart. The lid then falls to cover the receptacle and smother the fire.

When in a closed condition the lid is held tight down over the receptacle, and when open the lid is held rigid against the stop 4.

The device is rigid in structure and capable of long service, and has had no broken parts after many thousands of times of opening and closing the lid.

The lid is provided with a handle 15.

The above description is to be considered as illustrative and not limitative of the invention, of which modifications can be made without departing from the spirit and scope as set forth in the appended claim.

The invention having been described, what is claimed is:

In a receptacle for holding inflammable fluids, a plate pivoted on an edge of the receptacle and having an angularly directed portion directly over the receptacle, an arm connected to said portion by a low temperature solder, a plate pivotally connected to the arm and pivotally connected to the cover, and a coiled spring positioned between and connected to said plates.

EDWARD J. DOMAGALL.

REFERENCES CITED

The following references are of record in the file of this patent:

UNITED STATES PATENTS

| Number | Name | Date |
|---|---|---|
| 2,313,350 | Lebus | Mar. 9, 1943 |

FOREIGN PATENTS

| Number | Country | Date |
|---|---|---|
| 52,882 | Sweden | Oct. 11, 1922 |